United States Patent [19]

Freise

[11] Patent Number: 5,051,640
[45] Date of Patent: Sep. 24, 1991

[54] HETEROPOLAR EXCITED SYNCHRONOUS MACHINE

[75] Inventor: Werner Freise, Kaiserslautern, Fed. Rep. of Germany

[73] Assignee: Siemens Aktiengesellschaft, Berlin & Munich

[21] Appl. No.: 516,063

[22] Filed: Apr. 27, 1990

[30] Foreign Application Priority Data

Apr. 27, 1989 [EP] European Pat. Off. ........ 89107629.1

[51] Int. Cl.[5] ............................................. H02K 19/00
[52] U.S. Cl. .................................... 310/162; 310/179; 310/180; 310/184; 322/59; 322/63
[58] Field of Search ............... 310/162, 163, 165, 154, 310/179, 180, 184, 74, 153, 266, 160, 161, 78, 112, 113, 114; 322/59, 63, 66

[56] References Cited

U.S. PATENT DOCUMENTS 4,210,836  7/1980  Kouba ................................. 310/112
4,402,129  9/1983  Kreuzer et al. .................... 310/184

FOREIGN PATENT DOCUMENTS 0293796 12/1988 European Pat. Off. .
3009279 10/1981 Fed. Rep. of Germany .
3050269 10/1982 Fed. Rep. of Germany .

OTHER PUBLICATIONS

Soviet Inventions Illustrated, Sektion Elektrotechnik, Week E05, Abstr. No. B1972 E/05, X11, 3/17/82, Derwent Publications Ltd., London, GB (MOSC Aviation Inst), 4/28/81.

Primary Examiner—Steven L. Stephan
Assistant Examiner—Edward H. To
Attorney, Agent, or Firm—Kenyon & Kenyon

[57] ABSTRACT

A stator-excited synchronous machine with an unwound, toothed rotor has a stator which is subdivided into sectors each of which is wound with an excitation winding. Permanent magnets are disposed between the stator sectors tangentially. The permanent magnets' magnetic fields in the stator sector yokes are directed in the circumferential direction, opposite to those of the adjoining excitation windings.

34 Claims, 1 Drawing Sheet

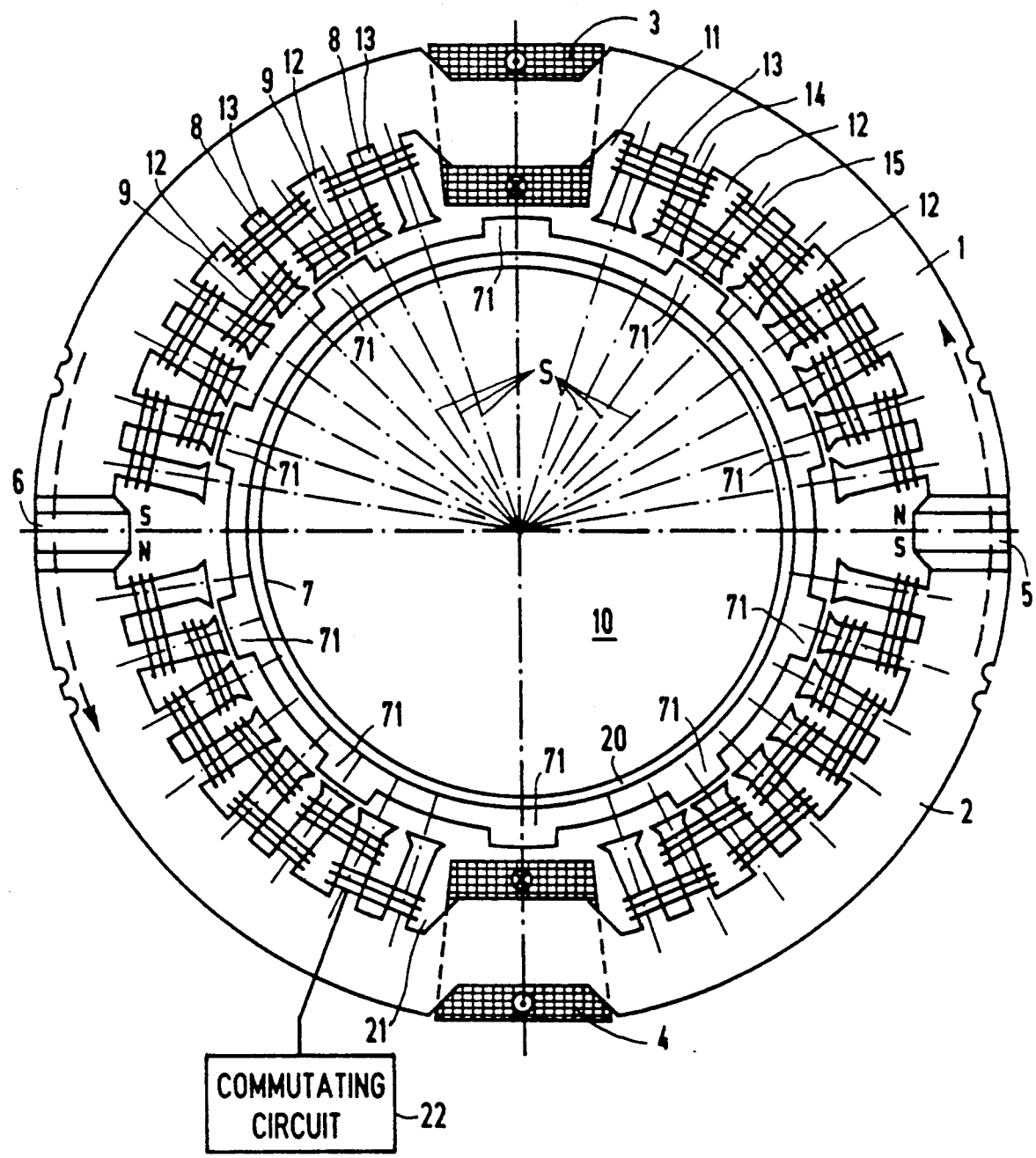

HETEROPOLAR EXCITED SYNCHRONOUS MACHINE

FIELD OF INVENTION

The invention relates to a synchronous machine and, more particularly, to a synchronous machine excited by means of heteropolarization.

BACKGROUND OF THE INVENTION

German reference DE-A1-30 09 279 discloses a synchronous machine having a stator with permanent magnets for the excitation, leaving more space providing the power windings than in the case where windings are used as the excitation. The permanent magnets are located around the stator side of the device. Further, a toothed laminated rotor is arranged inside the stator's inner circumference.

In this configuration known from the above German reference, the permanent magnets are utilized for operational excitation. In this manner of using the permanent magnets, one no longer needs an excitation winding. Thus, extra space is gained for the power windings and/or the machine weight can be economized for a synchronous machine provided as a generator. An embodiment of the German reference, however, has the permanent magnets partially replaced by exciting windings. The magnetic fields of the permanent magnets and the exciting windings work separately.

A heteropolar generator with a stator having the stator subdivided into stator sectors is also known from DE 3050269. With this type of stator, only the excitation windings are providing the excitation; they are wound around the stator yoke; permanent magnets are not used.

There is therefore needed a synchronous machine in which the electric excitation means on the stator is reduced, while maintaining or even reducing the size of the motor and preserving all advantages of an electric excitation system.

SUMMARY OF THE INVENTION

These needs are met by the synchronous machine of the present invention by subdividing the stator into stator sectors with permanent magnets in between. Excitation windings and power windings are provided on the stator sectors. A rotor is arranged inside the stator circumference separated by air gap from the stator. Each of the stator sectors is wound with an excitation winding and permanent magnets are located in the gaps between the sectors. Each permanent magnet has a magnetic field opposing the fields of the adjoining excitations windings. This design of the present invention, having the excitation winding wound around the stator yoke and the air-gap flux concentrated in the stator yoke accordingly, the excitation power demand, in comparison to the known design mentioned above for the stator-excited synchronous machine, can be advantageously decreased due to the considerably shorter excitation-winding turn lengths that are attainable. As a result of the arrangement of the magnetizing permanent magnets located at the ends of the stator sectors and having a magnetization opposite the magnetization of the adjoining excitation windings, the overall radial height of the stator yoke, the unwanted magnetic leakage and the necessary exciter power demand can be still further reduced. This is because the magnetic potential of the permanent magnets counteracts the electrically excited stray field and even contributes to a magnetic relief of the stator yoke sectors in the region of the exciter windings.

BRIEF DESCRIPTION OF THE DRAWING

The FIGURE is a schematic axial cross-sectional view of a wound stator system of the present invention.

DETAILED DESCRIPTION

The drawing shows a cross-sectional view of a wound stator system having two stator sectors 1, 2 forming a 4- pole exciting system. A rotor 7 having 40 rotor teeth 71 located on the air-gap side of the stator system is arranged in the stator bore of the system. For each stator sector 1, 2, excitation windings 3 and 4 wind around the stator sectors 1, 2. The excitation windings 3,4 are placed in the tangential middle of the stator sectors 1 and 2, respectively. Permanent magnets 5 or 6, having a tangential magnetization direction opposed to that of the exciter windings 3,4, are located between the stator sectors 1 and 2.

An embodiment of the synchronous machine with small dimensions and advantages from the standpoint of production engineering is characterized by the stator sectors 1 or 2. The stator sectors 1,2 in the region of the excitation windings 3, 4 are designed to run radially inward, while maintaining roughly the same cross-sectional width of the stator yoke. This forms stator slots 11 and 21 for the excitation windings 3 and 4, respectively.

According to an embodiment of the invention, the rotor 7 is integrated with a flywheel 20 or clutch system parts of an internal combustion engine (not shown), particularly in a motor vehicle. The inner radius of the rotor 7 forms a space which can be utilized advantageously for clutch components. It is beneficial if the stator sectors 1,2 only extend over a portion of the rotor circumference, particularly when the rotor is integrated with the flywheel and/or the clutch of an internal combustion engine. Thus, when the synchronous machine of the present invention is used as a motor or generator, the free space or gaps located on the stator side of the machine between the stator sectors can be used for further construction parts and, e.g. connecting bolts disposed between the internal combustion machine and a gear unit.

The magnetic fields of the permanent magnets 5,6 and excitation windings 3,4 counteract each other in the circumferential direction of the stator and add up in the air gaps in a functionally advantageous manner. This creates, in the disclosed example, a strong air-gap excitation field system, which, in spite of the application of permanent magnets, is nevertheless fully adjustable. When the excitation current is disconnected, the permanent magnetic field does not enter into the air gap of the machine, but rather has separate contact basically along the circumference of the machine. If a air-gap with zero field is not required, then the field contribution supplied by the permanent 5,6 magnets can be even greater than that of the excitation windings 3,4.

The overall axial length of the machine, is reduced in the case of m=2 or 4 and q=A, where m is the number of the phrase windings and q is the number of slots per pole and part winding. This occurs when the stator teeth 14 or 15 are disposed such that they alternately slant to the left or right, of the radial line of symmetry S, with the cross-sectional width of the stator slots 12 or 13 alternately widening toward the slot base or the slot opening. The drawing shows that, for example, the phase windings 9 wound around the slots 12 which are widened toward the slot base, and the phase windings 8 wound around the slots 13 which are widened toward the slot opening, can be accommodated in a manner resulting in a good radial distribution of the winding overhangs, i.e., the winding-overhang intersections which project axially over each other to a small extent.

The stator-excited synchronous machine according to the invention can be used both as a motor and as a generator in the same operating unit. In the case of a direct-current power supply, such as a motor vehicle electrical system, the power windings are coupled to an electronic commutating circuit 22.

What is claimed is:

1. A synchronous machine excited via heteropolarization comprising:
   a) a stator having a plurality of stator teeth, said stator teeth forming stator slots therebetween, said stator being subdivided into a plurality of stator sectors;
   b) a toothed, laminated rotor arranged in the inner circumference of the stator, the rotor teeth and the stator teeth forming an air-gap therebetween;
   c) at least one excitation winding coupled with the stator for generating an excitation magnetic field;
   d) a power winding formed around at least one of the stator's teeth;
   e) permanent magnets coupled with the stator generating permanent magnetic fields; and
   f) said plurality of stator sectors including one of said at least one excitation windings wound around each of said plurality of stator sectors, respectively, said permanent magnets being located between the stator sectors arranged tangentially to the inner circumference and having the permanent magnetic fields oppositely directed to the excitation magnetic fields of the excitation windings.

2. A synchronous machine according to claim 1, wherein the stator sectors having the permanent magnets arranged therebetween only extend over a portion of the circumference.

3. A synchronous machine according to claim 1 further comprising a flywheel of an internal combustion engine integrated with the rotor.

4. A synchronous machine according to claim 1 further comprising an electronic converter coupling for use as a direct-current motor.

5. A synchronous machine according to claim 1 wherein the stator sectors have an area with a reduced diameter which runs radially inward from the inner and outer circumferences of the stator sectors while maintaining substantially the same yoke cross-section width, before this area forms an excitation slot around which the excitation windings are wound.

6. A synchronous machine according to claim 2 further comprising a flywheel of an internal combustion engine integrated with the rotor.

7. A synchronous machine according to claim 2 further comprising an electronic converter coupling for a use as direct-current motor.

8. A synchronous machine according to claim 3 further comprising an electronic converter coupling for a use as direct-current motor.

9. A synchronous machine according to claim 2 wherein the stator sectors have a reduced cross-section area which runs radially inward from the inner and outer circumferences of the stator sections while maintaining substantially the same cross-section width, the reduced cross section area forms an excitation slot around which the excitation windings are wound.

10. A synchronous machine according to claim 3 wherein the stator sectors have a reduced cross-section area which runs radially inward from the inner and outer circumferences of the stator sectors while maintaining substantially the same cross-section width, the reduced cross section area forms an excitation slot around which the excitation windings are wound.

11. A synchronous machine according to claim 4 wherein the stator sectors have a reduced cross-section area which runs radially inward from the inner and outer circumferences of the stator sectors while maintaining substantially the same cross-section width, the reduced cross section area forms an excitation slot around which the excitation windings are wound.

12. The synchronous machine according to claim 1 further comprising a clutch part of an internal combustion engine integrated with the rotor.

13. The synchronous machine according to claim 1 further comprising a flywheel and a clutch part of an internal combustion engine integrated with the rotor.

14. The synchronous machine according to claim 1 further comprising an electronic converter coupling for use as a direct-current generator.

15. The synchronous machine according to claim 1 further comprising an electronic converter coupling for use as a direct-current motor and a direct-current generator.

16. The synchronous machine according to claim 2 further comprising a clutch part of an internal combustion engine integrated with the rotor.

17. The synchronous machine according to claim 2 further comprising a flywheel and a clutch part of an internal combustion engine integrated with the rotor.

18. The synchronous machine according to claim 2 further comprising an electronic converter coupling for use as a direct-current generator.

19. The synchronous machine according to claim 2 further comprising an electronic converter coupling for use as a direct-current motor and a direct-current generator.

20. The synchronous machine according to claim 3 further comprising an electronic converter coupling for use as a direct-current generator.

21. The synchronous machine according to claim 3 further comprising an electronic converter coupling for use as a direct-current motor.

22. The synchronous machine according to claim 3 further comprising an electronic converter coupling for use as a direct-current motor and a direct-current generator.

23. The synchronous machine according to claim 12 further comprising an electronic converter coupling for use as a direct-current motor.

24. The synchronous machine according to claim 12 further comprising an electronic converter coupling for use as a direct-current motor and a direct-current generator.

25. The synchronous machine according to claim 13 further comprising an electronic converter coupling for use as a direct-current motor.

26. The synchronous machine according to claim 13 further comprising an electronic converter coupling for use as a direct-current motor and a direct-current generator.

27. The synchronous machine according to claim 1, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot base.

28. The synchronous machine according to claim 1, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot opening.

29. The synchronous machine according to claim 2, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot base.

30. The synchronous machine according to claim 3, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot base.

31. The synchronous machine according to claim 4, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot base.

32. The synchronous machine according to claim 5, wherein:
 a) said power winding has a number "m" of phase windings, and m=2 through 4;
 b) said stator slots each have a base and an opening;
 c) a number "q" of said stator slots is provided per pole/phase winding, and q=1; and
 d) said stator teeth are disposed to alternately slant relative to a radial line of symmetry extending from a center of the synchronous machine such that a cross-section of said stator slots alternately widens toward the slot base.

33. The synchronous machine according to claim 12 further comprising an electronic converter coupling for use as a direct-current generator.

34. The synchronous machine according to claim 13 further comprising an electronic converter coupling for use as a direct-current generator.

* * * * *